(12) United States Patent
Jain et al.

(10) Patent No.: US 12,271,297 B2
(45) Date of Patent: Apr. 8, 2025

(54) PRE-PROVISIONING STORAGE VOLUMES IN THE PUBLIC CLOUD TO REDUCE PROVISIONING LATENCIES

(71) Applicant: International Business Machines Corporation, Armonk, NY (US)

(72) Inventors: Kapil Jain, Bedford, NH (US); Patrick Sullivan, Danville, NH (US); Michael Behrendt, Sindelfingen-Maichingen (DE)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 18/332,924

(22) Filed: Jun. 12, 2023

(65) Prior Publication Data
US 2024/0411681 A1 Dec. 12, 2024

(51) Int. Cl.
*G06F 12/02* (2006.01)

(52) U.S. Cl.
CPC .................. *G06F 12/023* (2013.01)

(58) Field of Classification Search
CPC ...... G06F 12/023; G06F 3/0631; G06F 3/067; G06F 3/0665
See application file for complete search history.

(56) References Cited

U.S. PATENT DOCUMENTS

| | | | |
|---|---|---|---|
| 7,558,864 B2 | 7/2009 | Kalantar | |
| 7,873,808 B2 | 1/2011 | Stewart | |
| 8,954,586 B2 | 2/2015 | Anderson | |
| 9,529,193 B2 | 12/2016 | Schwab | |
| 9,530,156 B2 | 12/2016 | Tyra | |
| 10,999,135 B2 | 5/2021 | Sharma | |
| 2008/0104131 A1 | 5/2008 | Stewart | |
| 2013/0019016 A1 | 1/2013 | Anderson | |
| 2013/0055251 A1* | 2/2013 | Anderson | G06F 9/5077 718/1 |
| 2013/0085899 A1 | 4/2013 | Tyra | |
| 2013/0111034 A1* | 5/2013 | Upadhya | G06F 3/0605 709/226 |
| 2014/0229622 A1 | 8/2014 | Supalov | |
| 2015/0055623 A1 | 2/2015 | Li | |
| 2015/0116320 A1 | 4/2015 | Schwab | |

(Continued)

OTHER PUBLICATIONS

Morato et al. "Assessment of Different OPC UA Implementations for Industrial IoT-Based Measurement Applications", IEEE Transactions on Instrumentation and Measurement vol. 70, 2021, 11 pages.

*Primary Examiner* — Zhuo H Li
(74) *Attorney, Agent, or Firm* — Kelsey M. Skodje (57) ABSTRACT

A system and related method reduce public cloud provisioning latencies using one or more processors. The method comprises, prior to receiving a volume provisioning request from a user, creating a pool of pre-provisioned generic volumes. The method further comprises receiving the request from the user to provision a volume from the pool, and then determining that a pre-provisioned generic volume is available for customization based on the request. Responsive to the determination, the method executes the actions comprising customizing the pre-provisioned generic volume based on the request, creating a custom volume, and providing the customized pre-provisioned volume to the user.

20 Claims, 4 Drawing Sheets

(56) References Cited

U.S. PATENT DOCUMENTS

| | | | | |
|---|---|---|---|---|
| 2016/0224244 A1* | 8/2016 | Gensler, Jr. | ............ | G06F 3/0631 |
| 2020/0285497 A1* | 9/2020 | Bangur | ................ | G06F 3/0605 |
| 2022/0382712 A1* | 12/2022 | Thomsen | .............. | H04L 9/0894 |
| 2024/0004563 A1* | 1/2024 | Singhal | ................ | G06F 3/0631 |

* cited by examiner

PRE-PROVISIONING STORAGE VOLUMES IN THE PUBLIC CLOUD TO REDUCE PROVISIONING LATENCIES

BACKGROUND

A system and method are described below for pre-provisioning storage volumes in the public cloud to reduce provisioning latencies.

SUMMARY

Disclosed herein is a computer-implemented method for reducing public cloud provisioning latencies using one or more processors. The method comprises, prior to receiving a volume provisioning request from a user, creating a pool of pre-provisioned generic volumes. The method further comprises receiving the request from the user to provision a volume from the pool, and then determining that a pre-provisioned generic volume is available for customization based on the request. Responsive to the determination, the method executes the actions comprising customizing the pre-provisioned generic volume based on the request, creating a custom volume, and providing the customized pre-provisioned volume to the user.

Disclosed herein is also a system for reducing public cloud provisioning latencies. The system comprises a memory and a processor that is configured to, prior to receiving a volume provisioning request from a user, create a pool of pre-provisioned generic volumes. The system receives the request from the user to provision a volume from the pool, and determines that a pre-provisioned generic volume is available for customization based on the request. Responsive to the determination, the system causes the processor to customize the pre-provisioned generic volume based on the request to create a custom volume and provide the customized pre-provisioned volume to the user.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
|---|---|
| CD-ROM | compact disc ROM |
| CPP | computer program product |
| DVD | digital versatile disk |
| EPROM | erasable programmable read-only memory |
| EUD | end-user device |
| IoT | Internet of Things |
| LAN | local-area network |
| NFC | near field communication |
| RAM | random access memory |
| ROM | read-only memory |
| SAN | storage area network |
| SD | secure digital |
| SDN | software-defined networking |
| SRAM | static random-access memory |
| UI | user interface |
| USB | universal serial bus |
| VCE | virtual computing environment |
| WAN | wide-area network |

Data Processing System in General

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
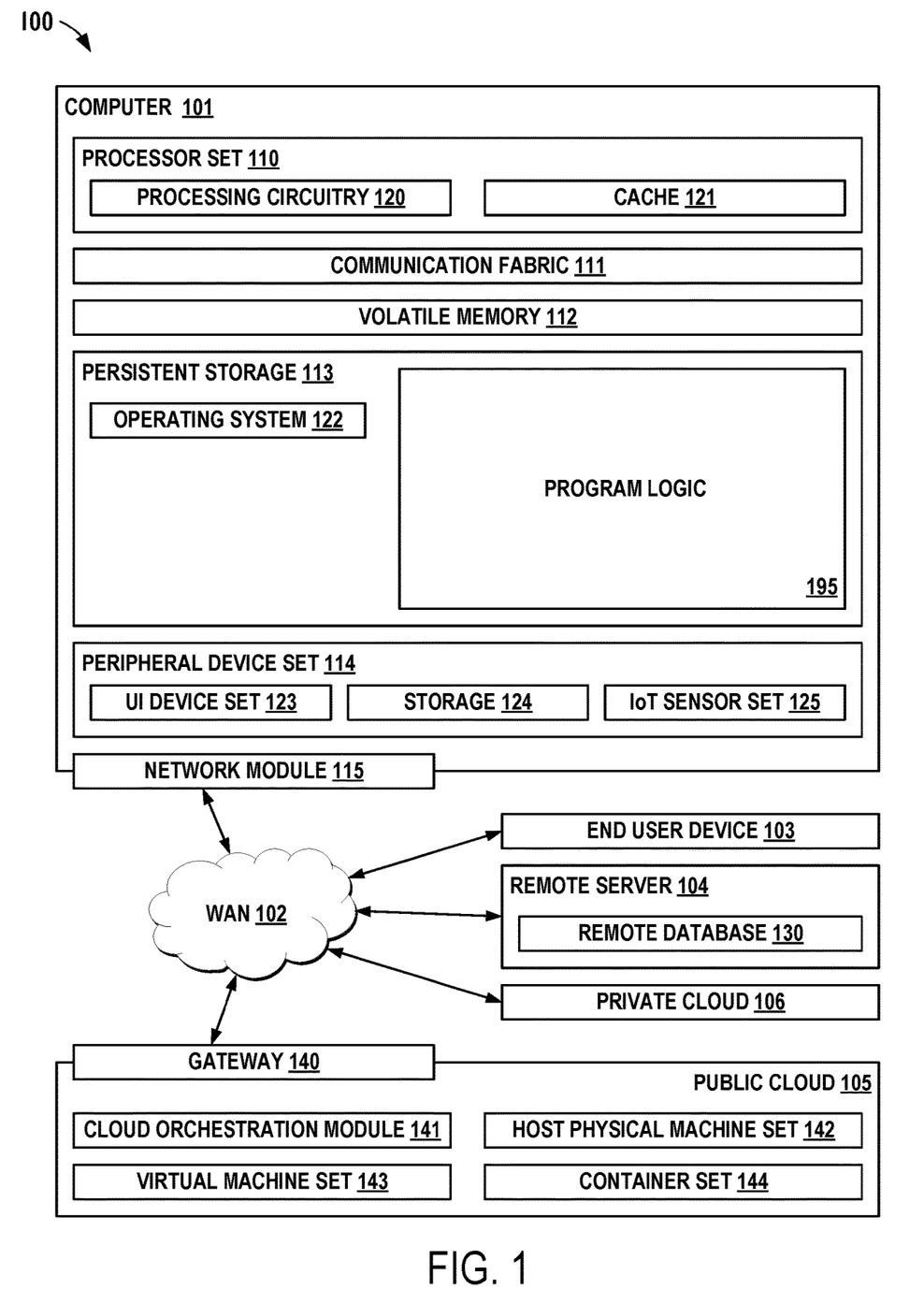
FIG. 1 is a block diagram of a general computing device and environment.

FIG. 1 is a block diagram of a general computing device and environment. Computing environment 100 contains an example of an environment for the execution of at least some of the computer code involved in performing the inventive methods disclosed herein, including program logic 195 that may be implemented in various combinations of hardware and/or software described below. In addition to the program logic 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program logic 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the program logic 195 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the program logic 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Certain reference numbers or characters may be represented as being pluralities (e.g., 100.1, 100.2, etc.). In such instances, reference to a single reference number (e.g., 100) may represent the plurality of entities, or may represent an example of the set, depending on the context. This similarly applies to reference numbers or characters that use subscripts.

Pre-Provisioning Storage Volumes in the Public Cloud to Reduce Provisioning Latencies The following application-specific acronyms may be used below:

TABLE 2

| Application-Specific Acronym | |
| --- | --- |
| API | application program interface |
| COW | copy-on-write |
| DC | datacenter |
| iSCSI | internet protocol small computer system interface |
| NFS | network file system |
| VM | virtual machine |
| VSI | virtual server instance |

Figure 2:
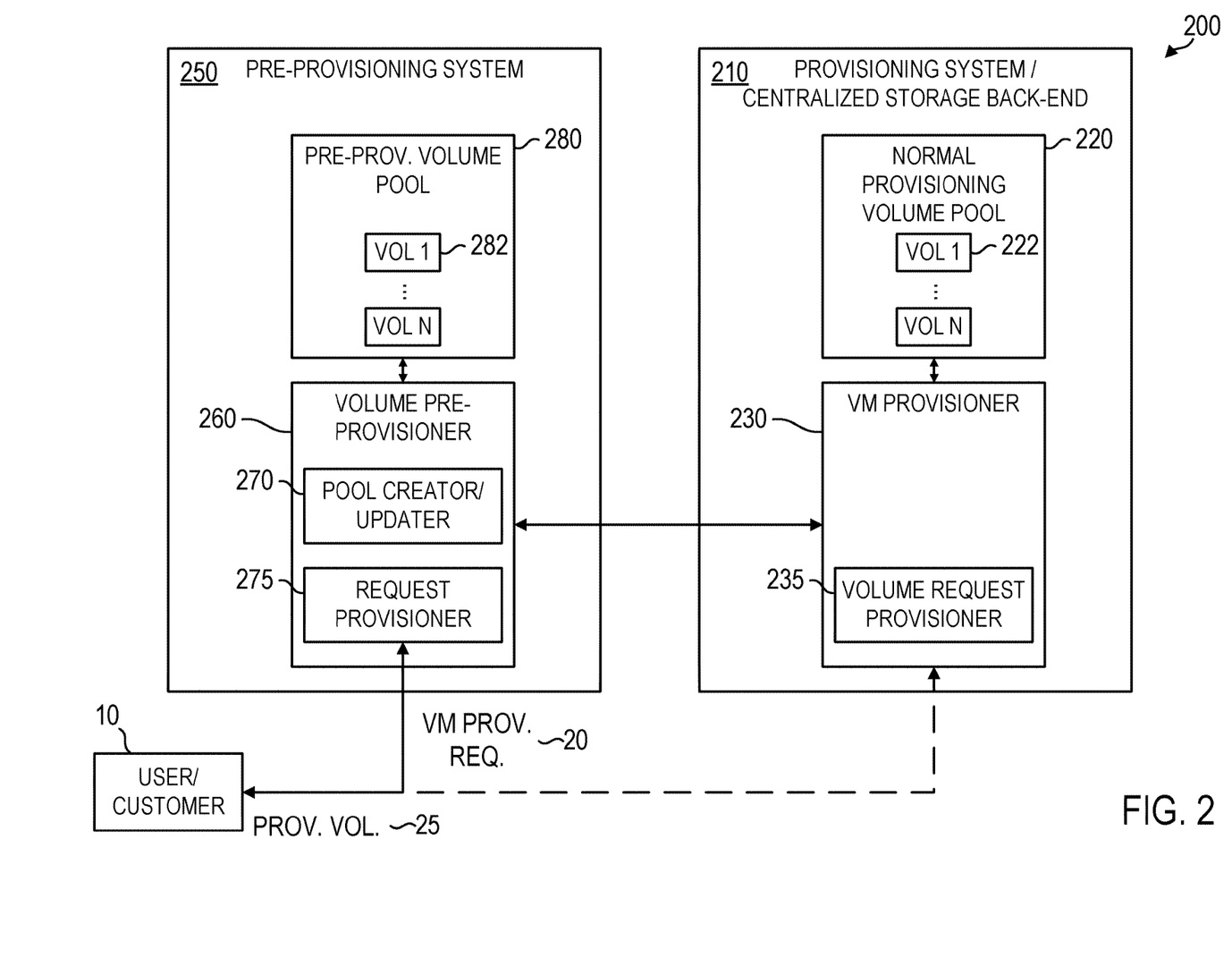
FIG. 2 is a block diagram illustrating an example environment in which the use of a pre-provisioning pool may operate, according to some embodiments.
Figure 3A:
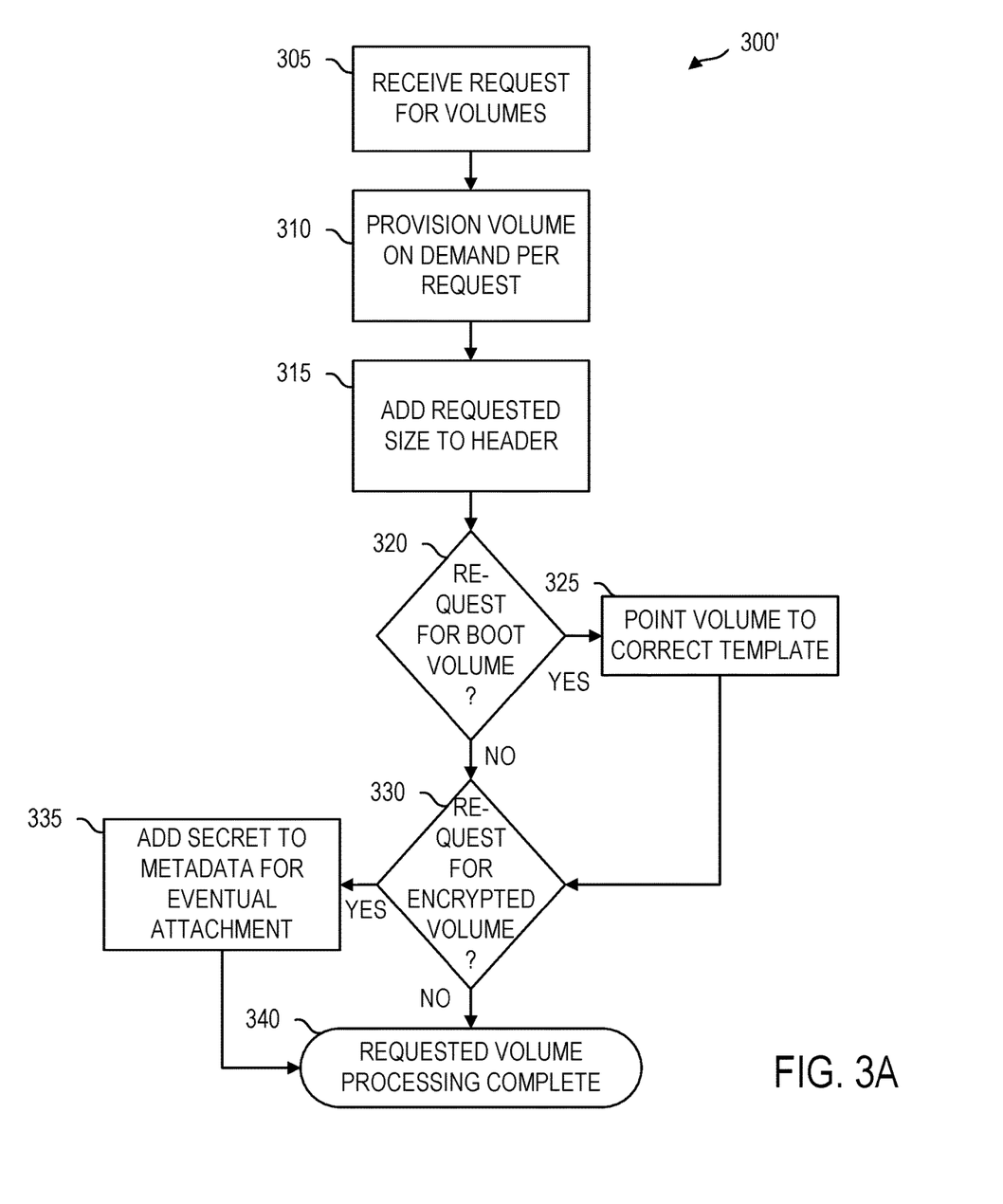
FIG. 3A is a flowchart illustrating a method for handling a user volume request without the use of pre-provisioning.
Figure 3B:
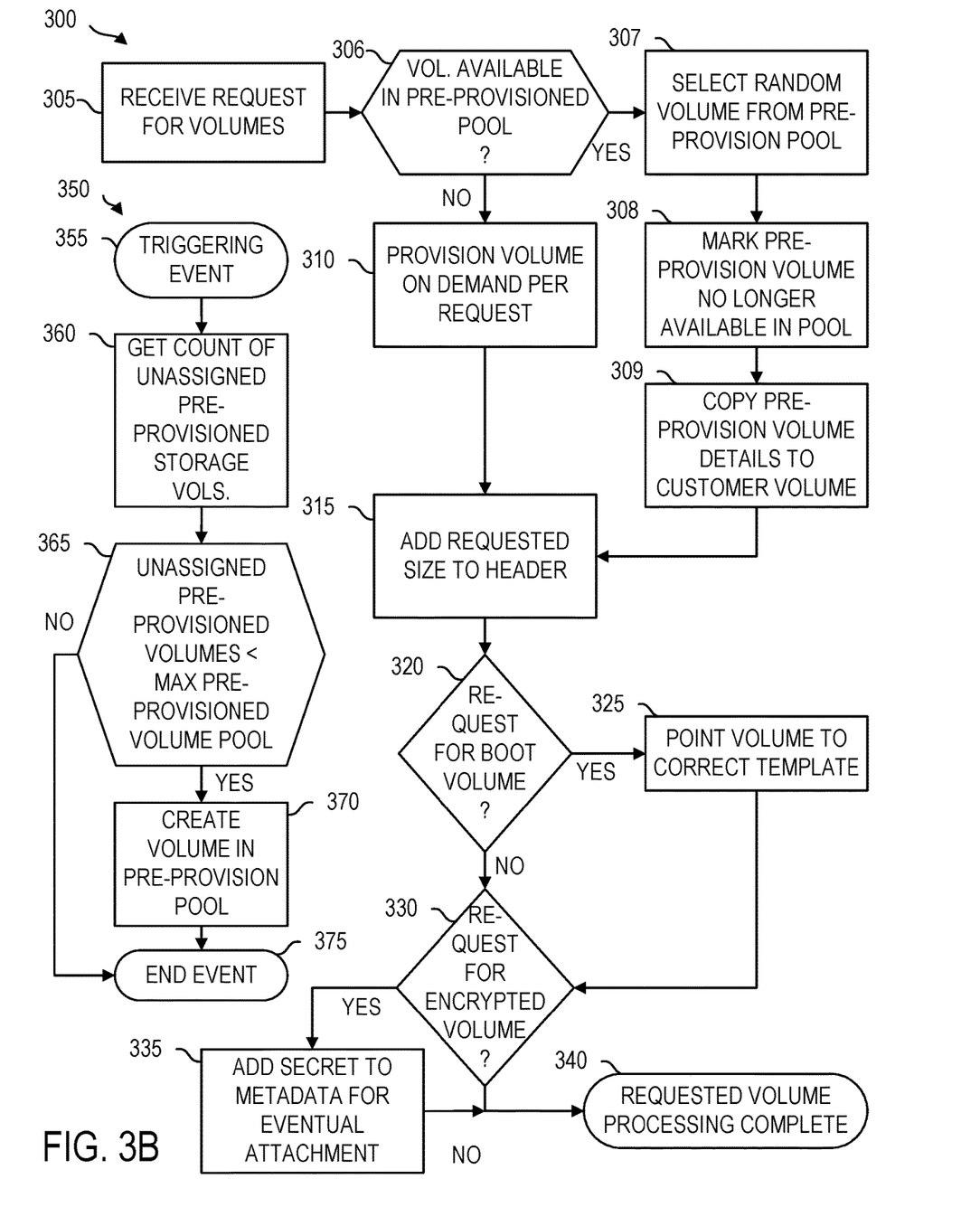
FIG. 3B contains flowcharts illustrating an example embodiment for handling a user volume request with the use of pre-provisioning.

FIG. 2 is a block diagram illustrating an example environment 200 in which the use of a pre-provisioning pool may operate. FIG. 3A is a flowchart 300' illustrating a method for handling a user volume request without the use of pre-provisioning. FIG. 3B is a flowchart 300 illustrating an example embodiment for handling a user volume request with the use of pre-provisioning. These figures will be described in combination with each other below.

In a multi-tenant cloud environment 200, such as the computing environment 100, users/customers 10 typically create virtual server instances (VSIs) or virtual machines (VMs) and create persistent block volumes 222 from a (normal) volume provisioning pool 220 of a centralized storage backend 210 for booting and data storage purposes. The centralized storage backend 210 may be comprised of, e.g., computers 101 as described above. The storage in this backend 210 may be, e.g., the persistent storage 113 described above. The system may be implemented in a public 105 and/or private 106 cloud described above. For the sake of conciseness, the term "VM" will be used herein as a proxy to represent both VMs and VSIs. The data/boot volumes 222 are typically provisioned from the volume provisioning pool 220 located on centralized network attached storage backends 210 with data sharing/access protocols like internet protocol small computer system interface (iSCSI), and network file system (NFS). This allows the VMs to be brought up anywhere within a datacenter (DC), and the same provisioned remote storage volumes 222 can be used irrespective of the choice of the hypervisor on which the VMs are scheduled. Most large cloud providers have DCs in multiple time zones in various geographies, however, customers usually create VMs in DCs in physical proximity to their business where data has gravity to the country's boundaries and network latencies are minimal.

When users 10 start their applications on in the cloud environment 200, one of the criteria for evaluation of the cloud environment 200 is the provisioning latency. The provisioning latency relates to the cumulative latency it takes to provision computing, networking, and storage artifacts (volume(s)) responsive to a VM provisioning request. Volume provisioning is typically the slowest activity in VM provisioning requests-generic volume provisioning takes approximately 90% of the total actual VM provision time. Since many VM provisioning requests can come in a multi-tenant cloud environment 200 in a burst mode, the latency experienced at the backend storage stack associated with volume provisioning may affect the overall experience of the users 10.

Referring to FIGS. 2 and 3A, the normal volume provisioning process 300' begins as a part of the overall VM provisioning process. The VM provisions happen on demand at the time the VM provisioning request 20 is made by the user 10. The customization of the size of volumes comes in the form of setting the size in the header of the volume 222. Here the generic volumes are allocated on backend storage systems 210 that typically have petabytes of storage available. When the user 10 requests a data/boot volume in their VM provisioning request 20, the systems are typically over-provisioned. This is based on the pattern of usage where even though a user 10 may request a volume of 1 TB at time T=1 s., the I/O pattern of usage may not write data blocks until a later point in time, e.g., T=100 s. As the data is written to the persistent media of the allocated storage volume 222, data blocks are allocated (consumed) and available capacity is decremented. Storage-backend administrators monitor the system to increase persistent media capacity when usage typically reaches a certain threshold of current available capacity, e.g., 60-70%.

In more detail, in operation 305, the VM request 20 is received by a VM provisioner 230 that provisions the computing, networking, and storage volume provisioning. The volume provisioner 235 begins volume provisioning as a part of the VM provisioning when a control plane makes remote application program interface (API) calls to the centralized storage backend 210. The VM provisioner 230 and the volume pre-provisioner 260 may be, in some embodiments, implemented in the form of program logic 195 described above.

In operation 310, a volume 222 is provisioned by the volume provisioner 235 from the normal volume provision pool 220 within the centralized storage backend 210. In operation 315, the requested volume size is added to the header. In operation 320, a check is made to determine if the request 20 is a request for a boot volume (as opposed to a data volume). If so (320:Y), then in operation 325, a proper template for the requested type of boot volume is pointed to and volume provision processing continues. If the request is not for a boot volume (320:N), then volume provision processing continues.

In operation 330, a further check is made to determine if the request 20 is for an encrypted volume. If so (330:Y), then in operation 335, a secret (e.g., encryption keys, etc.) may be added to metadata that will be associated with the volume. Then, in operation 340, the requested volume processing is complete, and the user 10 may be so informed and provided with access to the volume 222. If the request 20 is not for an encrypted volume (330:N), then execution simply continues to operation 340, as described above.

However, in this normal volume provisioning process 300', a burst of requests coming in the multi-tenant cloud environment could result in overloading or overwhelming the control plane and the centralized storage backend 210 and result in higher latencies compared to a time when there are fewer requests which can be handled by the centralized storage backend 210 and related subsystems. Slow storage provisioning time slows down VM provisioning overall. It is desirable to improve the speed and efficiency of the provisioning process (here, the provision latency for a VM), where such VM provisioning requires computing, network, and storage resources, the latter of which need to be accessible anywhere in the DC. An improvement to the provisioning of volumes is likely to have the greatest impact.

The parameters that distinguish volumes from one another may include size, operating system, and encryption. In the normal volume provisioning process 300' described above, storage is traditionally provisioned on demand and customized to a request. However, it is possible to, instead of fulfilling requests on demand, pre-create data/boot volumes, making them (almost) available in a pool in anticipation of upcoming demand. The pre-provisioned volumes will be available in a pool such that the requests can first be fulfilled out of that pool and remanent requests can be fulfilled on demand.

The pre-provisioning of volumes comes with the risk of a normal inventory management system-namely, the risk of estimating user demand when there is a variability of services/products offered. If user demand does not subsequently follow the estimations, then resources may be lost. The present disclosure leverages certain aspects in a multi-tenant cloud domain to address this issue of user demand.

The variability in data/boot volumes offered may be abstracted in the following ways: 1) a boot volume may be created using a choice of operating systems, for example, Microsoft Windows®, various distributions of Linux®, etc.; 2) data and boot volumes can be requested in various sizes, e.g., starting from something fairly small sized (e.g., 10 GB) to something large sized (e.g., 15 TB) with, e.g., a granularity of 1 GB. The values provided in this example are for illustration purposes to show the scope of variability; and 3) use of encrypted or unencrypted data.

If the pre-provisioning were to be done for volumes in each combination of the above categories and for each of the possible values, this could result in the creation of a huge number of pools when all combinations are taken into account. The inventory management system to support such variability would either have to be an exercise in the accurate prediction of demand or in the creation of all combinations or volumes. Either of these approaches would make the inventory management extremely unwieldy.

To avoid the negative aspects of either of the above approaches, the system disclosed herein relies on a middle ground of creating a generic volume ahead of time (pre-provisioning) and deferring the act of choosing a volume size, OS type in case of a boot volume, and encryption status until after a volume provisioning request comes in. Since roughly 90% of the steps involved in the actual provisioning of the volume are generic and may be done in advance, the remaining 10% of the customization is done on demand, i.e., when the volume provisioning request is received.

FIG. 3B shows flowcharts that illustrate the provisioning process 300 similar to that shown in FIG. 3A, but with additional operations associated with use of the pre-provisioned pool 280. FIG. 3B also shows the process 350 of creating the pre-provisioning pool.

The various embodiments described herein may leverage the above-described over-provisioning of volumes to (pre-request) create a container large enough to accommodate a volume of the largest size, such that when the specific request actually comes in, the size can be set in the header and the actual accounting corrected from the over-estimated large size to actual size. The volume(s) 282 is created in a generic non-customer account without having written a block of data. The pre-provisioned volume pool 280 is finite, and if the pool of unallocated, available volumes becomes full, no more volumes would be pre-provisioned. Since storage is the lengthiest portion of VM/VSI provisioning times, the advantage is that the storage backend and control plane 210 may be used when there is a lull in demand.

Of note, however, volume provisioning is the basis of various embodiments described herein, and this provisioning does not require involving any VM. These embodiments do not have a predefined set of service images, and can be used for any storage related use, while also being capable as being used as part of a new virtual machine's boot volume with a predefined image. The generic nature of the volumes provisioned means they can be used for anything. The pre-provisioning of storage volumes may be used to store any data and is not bound to any specific computing or predefined image contents. Generic volumes are created that can then be customized to fit the needs of the client versus a predefined set of direct access volumes that cannot be customized. However, various embodiments present the ability to provision a fully custom volume if customization is not possible on the generic volumes.

In more detail, prior to use, the pre-provisioned volume pool 280 must be created. The pre-provision pool 280 may be implemented, in some embodiments, as a single pool, which greatly simplifies the inventory management process. However, the pre-provision pool 280 may be broken up into sub-pools of pre-provisioned volumes. Such sub-pools may be based, e.g., on predicted volume requirements-however, these sub-pools do not require a hard-provisioned size, permitting a deferral of the actual size until the time of the actual provisioning request. The predicted volume requirements may utilize a historical database and make use of machine learning to better predict volume demand.

Furthermore, in some embodiments, the pre-provision pool does not require any pre-identification for usage patterns. The operations associated with the creation and maintenance of the pre-provisioning volume pool 280 (process 350, operations 355-375) may be performed by the create (and update) pre-provision pool 280, a triggering event 355 takes place. Such a triggering event 355 could be a periodic timer tick, a notification of a change in the amount of storage in the normal volume provision pool 220, a system start, restart, or recovery event that is detected, processing that falls below a certain utilization level, etc. The number of volumes in the pre-provision pool 280 is dynamic, and the triggering event 355 may be based on some predetermined threshold of system loading—that is, the pre-provisioning volume pool 280 may be loaded with the "heavy lifting" (i.e., resource intensive) provisioning part when the system is lightly loaded.

According to one embodiment, in operation 360, a pre-provisioned storage volume count (which may be zero) is determined. In operation 365, a check is made to see if the number of unassigned pre-provisioned volumes is less than (or equal to) some predefined threshold maximum number of pre-provisioned volumes for the pre-provisioned volume pool. If so (operation 365:Y), then in operation 370, a new pre-provisioned generic volume (unassigned volume) 282 is created in the pre-provision volume pool 280). If there is a maximum number of unassigned volumes 282 in the pre-provisioned volume pool 280, then no action is taken prior to the end of the event handling 375 (365:N).

In some embodiments, a rate at which volumes 282 are created in the pre-provisioned volume pool 280 may be controlled by dynamically adjusting a rate at which the triggering event 355 occurs, such as adjusting a frequency of a timer tick. Also, it may be possible to create more than one volume in the pre-provision pool (operation 370) according to some dynamically-adjustable parameter. For example, if it is determined that the system is experiencing a lull of activity, the pool creator 270 may shorten the timer tick from 0.2 seconds to 0.1 second (the timer ticks may be, but are not necessarily, in the sub-second range) to temporarily double the rate at which pre-provisioned volumes 282 are created. Thus, the timer is dynamic and may be adjusted to an optimal value based on any factor, e.g., system load. Similarly, the pool creator 270 may adjust a number of volumes created in operation 370, each time the triggering event handler 350 is invoked. For example, at each two-second clock tick, operation 370 might temporarily create two pre-provisioned volumes 282 in the pre-provisioned volume pool 280 instead of one in order to temporarily double the rate of pre-provisioned volume 282 creation. The triggering event handler 350 may operate independently of/asynchronously to the actual provisioning process 300.

Referring to FIG. 3B again, with the actual volume provisioning process 300, an actual user VM provisioning request 20 is received from the user 10, which likely includes a request for volumes (operation 305). Note that the use of the pre-provisioning pool/volumes may be invisible to the user, and may be called in the same manner and with the same request, format, and parameters as when the pre-provisioned volume pool 280 is not in use.

In some embodiments, the VM provisioning request 20 is received by the pre-provisioning system 250 request provisioner 275. The request provisioner 275 segregates out the volume request from other resource requests and passes on the other resource requests to the normal provisioning system 210, handling the volume provisioning request itself from the pre-provisioning 280 volume pool. In some other embodiments, the VM provisioning request 20 may go to the provisioning system 210 initially. The provisioning system then separates out the volume provisioning request and sends it to the volume request provisioner 275 of the pre-provisioning system 250 for fulfilment from the pre-provisioning volume pool 280.

In operation 306, after the request for volumes is received (operation 305), a check may be made by the provisioned volume requester 275 to determine if there is a volume available in the pre-provisioned generic volume pool 280. If not (306:N), processing proceeds according to operations 310 through 340 as described above with respect to FIG. 3A. If a volume is available in the pre-provisioned volume pool 280, then, in operation 307, a random (available) volume 282 from the pool 280 is selected. In operation 308, this selected volume 282 is marked as no longer available in the pool 280.

In operation 309, particular details provided by the user 10 in the VM provisioning request 20 are copied into the pre-provisioned volume 282 to customize it. Customization of the pre-provisioned volume may be performed quickly since there is very little overhead in provisioning the volumes in advance. By using these pre-created volumes 282, requests can be fulfilled promptly with a very low latency. This flattens the fulfillment curve vs. the demand curve (which may be a spike) and can be done without stressing the centralized storage backend 210. Risk is minimized because the generic (pre-provisioned) volume 282 is usable and inventory is maintained in one pool (the pre-provisioning volume pool 280). Storage usage may be determined by the actual used size vs. allocated size. Encryption of the volume may be deferred until attachment time, and the operating system choice may be deferred via a copy-on-write (COW) process. From operation 309, execution proceeds to operation 315 as described above with respect to FIG. 3A.

With respect to operations 320, 325, described here in more detail, the customization of the boot volume 282 comes by leveraging a concept of layers of data block where the highest layer is the only writeable layer and the lower layers are read-only. The lower layer represents data blocks that cannot be modified and are frozen in time.

By way of example, if a volume provisioning request was to create a Linux® Virtual machine of Ubuntu® distribution version 22.04, the top layer of such a boot volume 282 which was pre-provisioned ahead of time would remain the same, and the bottom (read-only) image layer that the top layer points to would be the one that changes. If the user 10, during operation of the VM, wanted the update some data blocks represented by the read-only layer, those data blocks would be owned by the top writable layer. This system of managing volumes by layer is popularly known as a copy-on-write (COW) system. If a unit of data is copied but not modified, the "copy" can exist as a reference to the original data. Only when the copied data is modified is a copy created, and new bytes are actually written.

By way of further example, according to various embodiments, a generic storage volume 282 is taken from the single pre-provisioned pool 280, and is made into a boot volume of type RED HAT® by linking it to the requested image. If the request 20 indicated a need for a data volume of size 100 GB in addition, a volume from the same generic pre-provisioned pool 280 may be used to make it a data volume of the requested size.

With regard to operations 330, 335, the variability that comes from encryption may be managed yet again by creating only one kind of volume 282 and providing the key material (operation 335) to the virtualization layer such that all writes getting past the virtualization layer are encrypted. This may be a one-time activity of setting the encryption type traditionally done on-demand with a key management system. Every subsequent attachment makes use of the key material to encrypt the data blocks if encryption is enabled. This has the added advantage of encrypting data as it is sent over the network to prevent data from being seen/intercepted en route. Then, in operation 340, the requested volume processing is complete, and the user 10 may be so informed 25 and provided with access to the customized volume 282 from the pre-provisioned volume pool 280. If the request 20 is not for an encrypted volume (330:N), then execution simply continues to operation 340, as described above.

Technical Application

The one or more embodiments disclosed herein accordingly provide an improvement to technology, namely to improving the speed at which a storage or boot volume can be provisioned in a cloud environment after being requested by a user.

What is claimed is:

1. A computer-implemented method for reducing public cloud provisioning latencies using one or more processors, the method comprising:
   prior to receiving a volume provisioning request from a user, creating a pool of pre-provisioned generic volumes, wherein the creating comprises:
      receiving a triggering event, and responsive to receiving the triggering event:
         determining a count of unassigned pre-provisioned storage volumes in the pool of pre-provisioned generic volumes; and
         conditioned upon the count being less than or equal to a threshold maximum number or storage amount of the pre-provisioned storage volumes, creating a generic volume in the pool of pre-provisioned generic volumes;
   receiving the request from the user;
   determining that a pre-provisioned generic volume is available for customization based on the request; and
   responsive to the determination, executing actions comprising:
      customizing the pre-provisioned generic volume based on the request;
      creating a custom volume; and
      providing the customized pre-provisioned volume to the user.

2. The method of claim 1, further comprising:
   responsive to the pre-provisioned generic volume not being available for customization, provisioning, by the one or more processors, a custom volume from a normal provisioning volume pool based on the request.

3. The method of claim 1, wherein the pool of pre-provisioned generic volumes comprises sub-pools of pre-provisioned generic volumes based on predicted volume requirements.

4. The method of claim 1, wherein the customizing comprises adding a requested size to a header of the volume.

5. The method of claim 1, wherein the customizing comprises:
   determining that the request is a request for a boot volume; and
   based on the determining, using a template related to the request for the boot volume.

6. The method of claim 1, wherein the customizing comprises:
   determining that the request is a request for an encrypted volume; and
   based on the determining, adding a secret to metadata for eventual attachment to the volume.

7. The method of claim 1, wherein creating the custom volume comprises:
   selecting a random generic volume from the pool of pre-provisioned generic volumes;
   marking the generic volume as no longer available in the pool; and
   copying pre-provision volume details provided by the user to the generic volume to make it a customized volume.

8. The method of claim 1, wherein the triggering event is a timer expiration or a timer tick.

9. The method of claim 1, wherein the triggering event is based on available processor resources of a centralized storage back end.

10. The method of claim 1, wherein creating a generic volume comprises creating a plurality of generic volumes per triggering event.

11. The method of claim 1, wherein the request is a request for a boot volume and the boot volume is provisioned according to a copy-on-write system.

12. The method of claim 1, wherein the triggering event is based on available processor resources of a centralized storage back end.

13. A system for reducing public cloud provisioning latencies, comprising:
   a memory; and
   a processor that is configured to:
      prior to receiving a volume provisioning request from a user, create a pool of pre-provisioned generic volumes, wherein the creating comprises:
         receiving a triggering event, and responsive to receiving the triggering event:
            determining a count of unassigned pre-provisioned storage volumes in the pool of pre-provisioned generic volumes; and
            conditioned upon the count being less than or equal to a threshold maximum number or storage amount of the pre-provisioned storage volumes, creating a generic volume in the pool of pre-provisioned generic volumes;
      receive the request from the user;
      determine that a pre-provisioned generic volume is available for customization based on the request; and
      responsive to the determination:
         customize the pre-provisioned generic volume based on the request to create a custom volume; and
         provide the customized pre-provisioned generic volume to the user.

14. The system of claim 13, further comprising:
   responsive to the pre-provisioned generic volume not being available for customization, provisioning, by the processor, a custom volume from a normal provisioning volume pool based on the request.

15. The system of claim 13, wherein the customizing comprises:
   determining that the request is a request for a boot volume; and
   based on the determining, using a template related to the request for the boot volume.

16. The system of claim 13, wherein the customizing comprises:
   determining that the request is a request for an encrypted volume; and
   based on the determining, adding a secret to metadata for eventual attachment to the volume.

17. The system of claim 13, wherein creating the custom volume comprises:
   selecting a random generic volume from the pool of pre-provisioned generic volumes;
   marking the generic volume as no longer available in the pool; and
   copying pre-provision volume details provided by the user to the generic volume to make it a customized volume.

18. The system of claim 13,
   wherein the triggering event is based on available processor resources of a centralized storage back end.

19. The system of claim 13, wherein creating a generic volume comprises creating a plurality of generic volumes per triggering event.

20. A computer program product for reducing public cloud provisioning latencies, the computer program product comprising:
> one or more computer readable storage media, and program instructions collectively stored on the one or more computer readable storage media, the program instructions comprising program instructions to, when executed on a processor:
> prior to receiving a volume provisioning request from a user, create a pool of pre-provisioned generic volumes, wherein the creating comprises:
>> receiving a triggering event, and responsive to receiving the triggering event:
>>> determining a count of unassigned pre-provisioned storage volumes in the pool of pre-provisioned generic volumes; and
>>> conditioned upon the count being less than or equal to a threshold maximum number or storage amount of the pre-provisioned storage volumes, creating a generic volume in the pool of pre-provisioned generic volumes;
> receive the request from the user;
> determine that a pre-provisioned generic volume is available for customization based on the request; and
> responsive to the determination, causing the processor to:
>> customize the pre-provisioned generic volume based on the request to create a custom volume; and
>> provide the customized pre-provisioned volume to the user.

* * * * *